United States Patent [19]

Guilhaumon et al.

[11] Patent Number: 6,078,883

[45] Date of Patent: *Jun. 20, 2000

[54] METHOD FOR TRAINING A SPEECH RECOGNITION SYSTEM AND AN APPARATUS FOR PRACTISING THE METHOD, IN PARTICULAR, A PORTABLE TELEPHONE APPARATUS

[75] Inventors: Benoit Guilhaumon; Gilles Miet, both of Le Mans, France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/992,288

[22] Filed: Dec. 17, 1997

[30] Foreign Application Priority Data

Dec. 24, 1996 [EP] European Pat. Off. ............... 96402881

[51] Int. Cl.⁷ ..................................................... G10L 15/06
[52] U.S. Cl. ........................... 704/236; 704/240; 704/243; 704/256
[58] Field of Search .................................... 704/232, 231, 704/235, 236, 275, 270, 286, 244

[56] References Cited

U.S. PATENT DOCUMENTS

| | | | |
|---|---|---|---|
| 4,644,107 | 2/1987 | Clowes et al. | 379/354 |
| 4,783,803 | 11/1988 | Baker et al. | 704/252 |
| 4,972,485 | 11/1990 | Dautrich et al. | 381/43 |
| 5,758,023 | 5/1998 | Bordeaux | 704/232 |
| 5,806,029 | 9/1998 | Buhrke et al. | 704/244 |
| 5,842,161 | 11/1998 | Cohrs et al. | 704/244 |
| 5,842,164 | 11/1998 | Fine | 704/244 |
| 5,950,158 | 9/1999 | Wang | 704/244 |
| 5,960,393 | 9/1999 | Cohrs et al. | 704/240 |
| 5,960,397 | 9/1999 | Rahim | 704/244 |
| 5,963,902 | 10/1999 | Wang | 704/243 |

FOREIGN PATENT DOCUMENTS

| | | | |
|---|---|---|---|
| 0494526 | 7/1992 | European Pat. Off. | H04M 1/57 |
| 0601876A1 | 6/1994 | European Pat. Off. | G10L 3/00 |
| 2098773 | 11/1982 | United Kingdom | G10L 1/00 |

*Primary Examiner*—David R. Hudspeth
*Assistant Examiner*—Susan Wieland

[57] ABSTRACT

For training a speech recognition to a multi-item repertoire, the following steps are executed: a speech item is presented by a user person, and the distinctivity thereof in the repertoire is asserted. Under control of a distinctivity found the speech item is inserted into the repertoire. These steps are repeated until reaching repertoire sufficiency. In particular, the asserting determines a likeness among the actually presented speech item and all items already in the repertoire, wherein undue likeness with one particular stored item creates a contingency procedure. This implies offering to the user a choice between ignoring the actually presented speech item and alternatively inserting the actually presented speech item at a price of deleting the particular stored item.

6 Claims, 5 Drawing Sheets

METHOD FOR TRAINING A SPEECH RECOGNITION SYSTEM AND AN APPARATUS FOR PRACTISING THE METHOD, IN PARTICULAR, A PORTABLE TELEPHONE APPARATUS

BACKGROUND TO THE INVENTION

The invention relates to a method for training a speech recognition system to a multi-item repertoire, said method comprising the steps of:
  presenting a speech item by a user person;
  asserting distinctivity of said presented speech item in said repertoire;
  under control of a distinctivity found inserting said presented speech item into the repertoire;
  repeating these steps until reaching sufficiency of the repertoire. Speech recognition has become a commercially hot subject, that finds application in highly sophisticated professional systems, but also in bottom-line consumer gadgets and devices. A particular instance of the latter are portable telephones; certain such devices are controllable by speech that may represent digits, standard telephone expressions such as voice commands like connect, stop, terminate, hold, and further relevant words and phrases. Other applicable speech items may be personal names, firm names, and words like boss, wife and secretary, to thus enable speeded-up or abbreviated dialling. Of course, similar vocabularies find application in other languages. It has been found that in particular the use of such largely unconstrained terms may create a great deal of confusion. For example, certain names may have a likeness to each other. Also, certain names may sound like said standard terms or voice commands, even when the spelling we different. For example, wife may be difficult to distinguish from five, the Dutch word Ach or Agt (eight) is in use both as a family name, and as the name of a village. Further confusion between recognized words may occur in a cross-language situation, where a person uses words from different languages such as one (English, 1)—wann (German, when?)
sept (French, 7)—set (English)
huit (French, 8)—wie (German, how?)
dix (French, 10)—this (English)

In consequence, a need has been recognized for maintaining the stored repertoire, i.e., a set of recognized speech expressions or utterances, in such a manageable way that the probability for confusion remains minimal, given the actual performance of the system in question. European Patent Application EP 601 876 discloses a system wherein a new phrase or utterance that would cause confusion with a previously is blocked from being stored.

SUMMARY TO THE INVENTION

The present invention has however recognized that the earlier system is too inflexible, and in consequence, amongst other things it is an object of the present invention to manage the stored database in such a manner that flexibility is maintained, while the possibility for confusion is minimized. Now accordingly, the invention is characterized in that said asserting determines likenesses between the actually presented speech item and all items already in the repertoire, wherein undue likeness with one particular stored item creates a contingency procedure that offers said user person a choice between ignoring the actually presented speech item, and alternatively inserting the actually presented speech item at a price of deleting the particular stored item.

The invention also relates to a telephone apparatus comprising means for training a speech recognition system to a multi-item repertoire, and comprising input means for receiving a speech item presented by a user person;
  distinctivity asserting means of said presented speech item in said repertoire;
  inserting means for under control of a distinctivity found by said distinctivity asserting means inserting said presented speech item into the repertoire;
  repeat control means for repeating these steps until reaching sufficiency of the repertoire,
  and telephone functionality means having control input means fed by an output of said speech recognition system for receiving control data recognized from received speech items in a non-training state,
    characterized in that said distinctivity asserting means are arranged to determine likenesses between the actually presented speech item and all items already in the repertoire, wherein undue likeness with one particular stored item creates a contingency procedure that offers said user person a choice between ignoring the actually presented speech item, and alternatively inserting the actually presented speech item at a price of deleting the particular stored item.

By itself, voice-controlled telephones have been found usage in such situations where button-dialling, i.e., dialing while using the keys of a keyboard, is uncomfortable, such as under insufficient ambient lighting conditions or when the user has only one hand free, or even needs a hands-free apparatus. Further advantageous aspects of the invention are recited in dependent claims.

BRIEF DESCRIPTION OF THE DRAWING

These and further aspects and advantages of the invention will be discussed more in detail hereinafter with reference to the detailed disclosure of preferred embodiments, and more in particular with reference to the appended Figures that show.

DETAILED DESCRIPTION OF PREFERRED EMBODIMENTS

Figure 1:
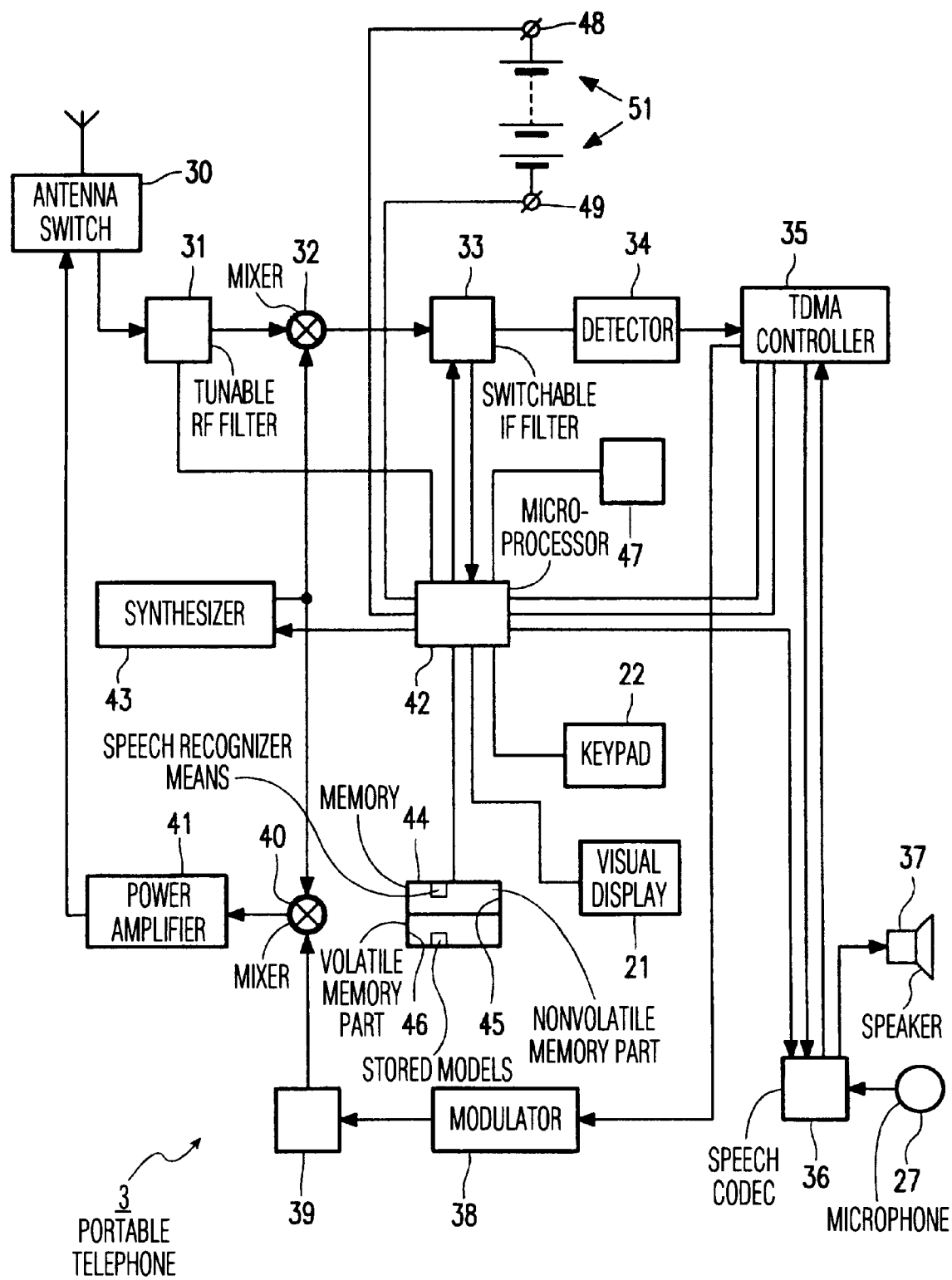
FIG. 1, a block diagram of a portable telephone.

FIG. 1 is a block diagram of a portable telephone, generally as disclosed in European Patent EP 494 526 B1. The diagram has the device 3 comprising a reception path and a transmission path, both coupled to antenna switch 30. The reception path comprises a cascade of a tunable RF filter 31, a mixer 32, a switchable IF_filter 33, a detector 34, a Time Division Multiplex Access (TDMA) controller 35, a speech CODEC 36, and a speaker 37. The transmission path comprises a cascade of a microphone 27, the speech CODEC 36, the TDMA controller 35, a modulator 38, an offset oscillator 39, a mixer 40, and a power amplifier 41. A microprocessor 42 is provided for controlling the functionality of the telephone 3. Various conventional features such as the controlling of a synthesizer 43 so as to tune to a specific frequency channel, controlling TDMA controller 35, scanning the keypad 22, and controlling the visual display 21, have not been described here in further detail, such functioning per se being well-known in the art. A memory 44 including a nonvolatile memory part 45 and a volatile memory part 46 is coupled to the microprocessor 42. The nonvolatile memory part 45 comprises a telephone functionality program. Furthermore, the device comprises power leads 48 and 49, interconnected to an exchangeable battery 50 for powering the device. By way of implication, only the powering of microprocessor 42 has been indicated.

Figure 2:
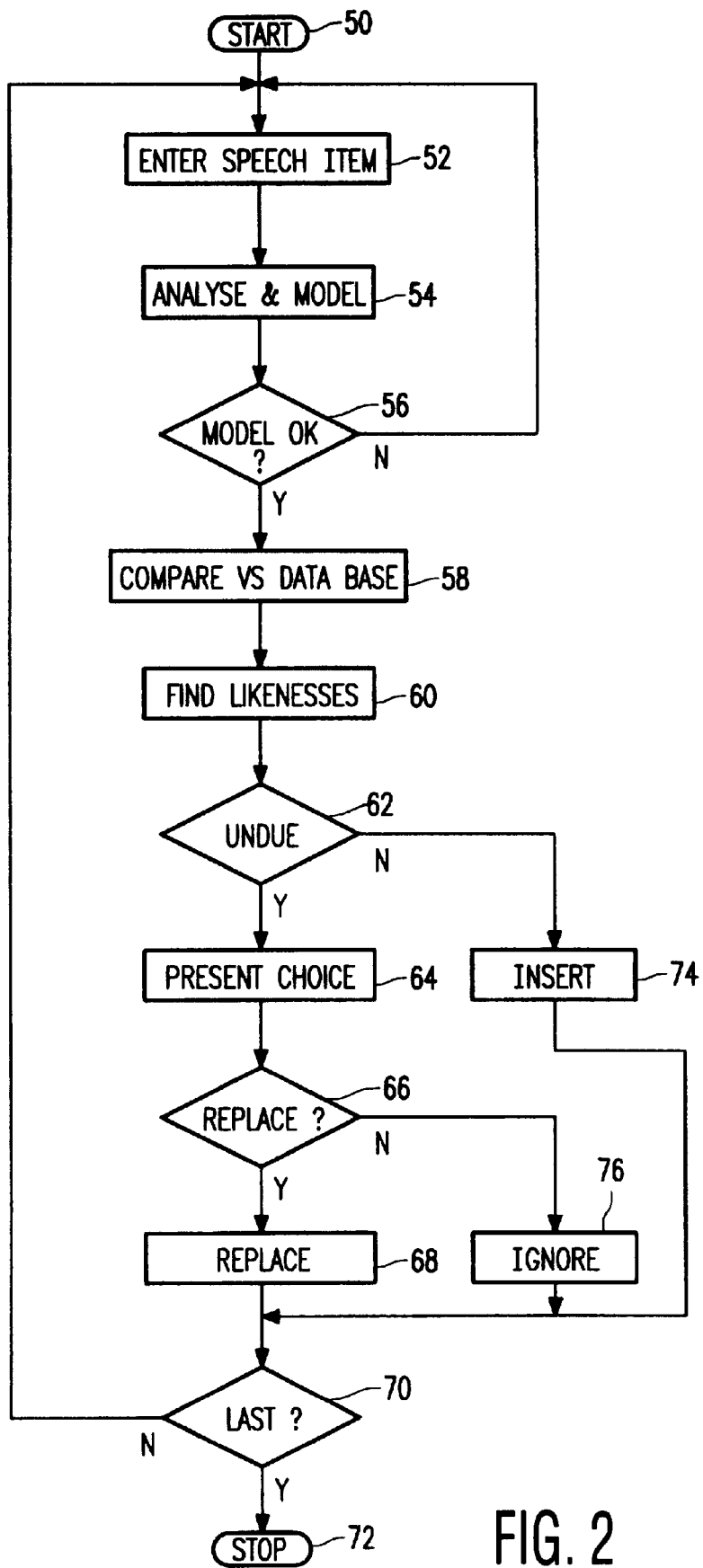
FIG. 2, a flow chart of the method.

FIG. 2 is a flow chart of the method according to the invention. In block 50, the training procedure of the apparatus is initialized. For example, in a portable telephone this requires that any ongoing call has been terminated, the telephone then being in idle mode. Further, the application program of the training, inclusive of a speech recognition program, is started, for example through an associated control button not shown in FIG. 1. The speech recognition may be trained for user-dependent or for user-independent application. In block 50, the first speech item, i.e., an utterance of a user of the portable telephone, is entered, which may represent a single word or a string of separated words, i.e, isolated words; moreover, a manual input is entered that represents the meaning of the entry, for example, whether this is the destination label for abbreviated dialling. The specific procedure for linking the speech to a particular telephone functionality aspect has not been considered for brevity. In block 54, the speech item, or user utterance is analyzed and modeled. For example, the apparatus may request three training examples in sequence. If the modelling signals a Non-O.K. quality, i.e., the modeled user utterances are not sufficiently reliable to be used in said training procedure, the system rejects the modeled user utterances and goes back to block 52. If the modelling is O.K., i.e., the modeled user utterances are sufficiently reliable to be used in said training procedure, in block 58 the recognized speech item is compared to all appropriate stored items in the speech database of the apparatus. This comparing may be effected according to various procedures that are known in the art, such as have been described in U.S. Ser. No. 07/860,199 (PHD 89158), U.S. Ser. No. 08/425,305 (PHD 91136), U.S. Ser. No. 08/312,495 (PHD 91137), U.S. Ser. No. 08/563,853 (PHD 91138), U.S. Ser. No. 08/203,105 (PHD 93034), and U.S. Ser. No. 08/587,190, all to the present assignee. Each such comparison will produce a likeness-indicator, or likelihood score, that may be a scalar quantity, or a quantity defined in more than one dimension. In block 60, the likenesses, i.e., determined likelihood scores, are ranked, and if applicable, a few critical ones are selected for further consideration. In block 62, any undue likeness is assessed: certain likenesses that are too close to likelihood scores of previously stored models of recognized user utterances are judged as undue. If none undue, in block 74 the new item has enough distinctivity as regards previously stored ones and is inserted into the speech database. Accordingly, upon subsequent reception of an associated speech item, i.e., a speech item similar to a stored one, the latter can be recognized and converted into the underlying data. In block 70, it is detected whether this is the last item to be entered. The end is signalled by a keystroke, by a time lapse, or by any other appropriate means. If so, the system goes to block 72, and terminates the training. Alternatively, a new speech item can be inputted in block 52.

If any undue likeness is found in block 62, the system goes to block 64, and presents to the user person the choice between the two or more speech items that resemble each other too closely, i.e., the difference between a modeled inputted user utterance and a previously stored speech model, a so-called template, is too small. In block 66, the system offers to the user person the choice to replace the model of the earlier stored item or not. If yes, in block 68 the old item by the model of the recognized inputted speech item is replaced. If no, in block 76 the new item is ignored. In both situations, the system proceeds to block 70.

Figure 3A:
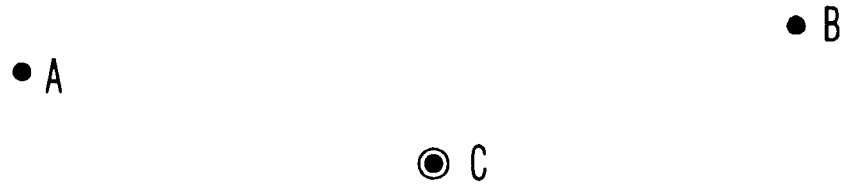
FIGS. 3A–3C illustrate various likeness configurations.
Figure 3B:
Figure 3C:

FIGS. 3A–3C illustrate various likeness configurations. In all three diagrams, there are two earlier speech items A, and B represented in a virtual space that shows the various distances or likenesses, a large distance meaning little likeness and vice versa. Here, the often complex expressions that quantify the distances are, for purposes of education, symbolized as geometrical distances in a two-dimensional plane. The newly presented speech item is represented by C. In FIG. 3A, the distance between C and either A or B is sufficient that no undue likeness occurs. Therefore, C may be inserted. In FIG. 3B, C is close to A, but far enough from B. This means that the user has a choice between having either A, or C in the library, i.e., the speech database, but not both. In FIG. 3C the likeness between C and both A and B is undue that is, too close, so that a user may choose between either keeping both A and B or alternatively, C alone. In certain situations, the deletion of a subset of the stored speech items may be blocked, such as for the digits "zero" to "nine" in a portable telephone application, when the digits for dialling are also inputted in the form of speech. Note that certain likeness may depend on other likeness, so that the former may be determined in an implicit manner.

Figure 4:
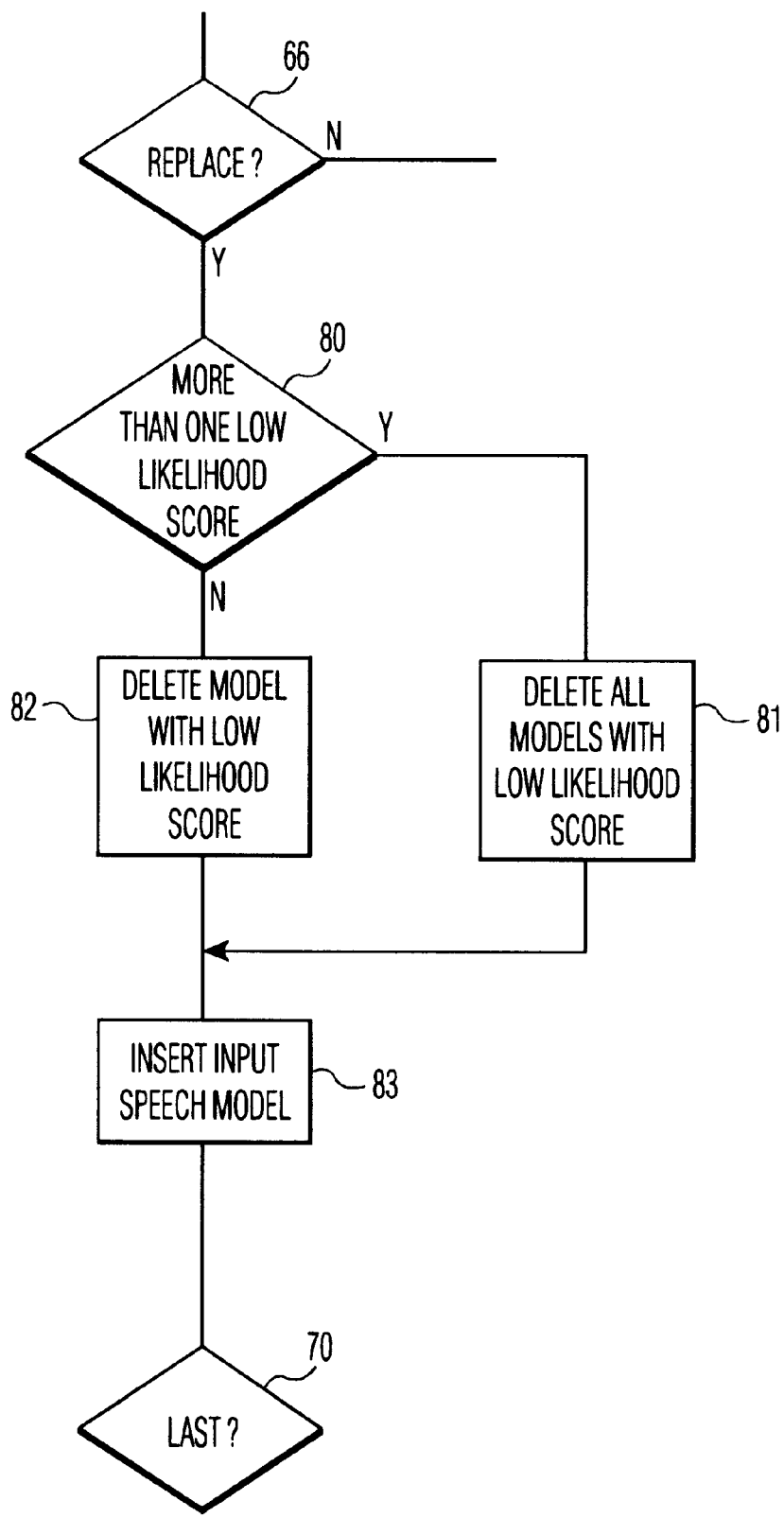
FIG. 4 in more detail shows replacement of a speech item in the data base.

FIG. 4 in more detail shows replacement of a speech item in the data base. In block 80, it is tested if there is more than one previously stored speech model corresponding to low likelihood scores. If so, in block 81, all models with the low likelihood score are deleted. If not, in block 82, the model with the low likelihood score is deleted. In block 83, the input speech recognition model is inserted in the data base.

Figure 5:
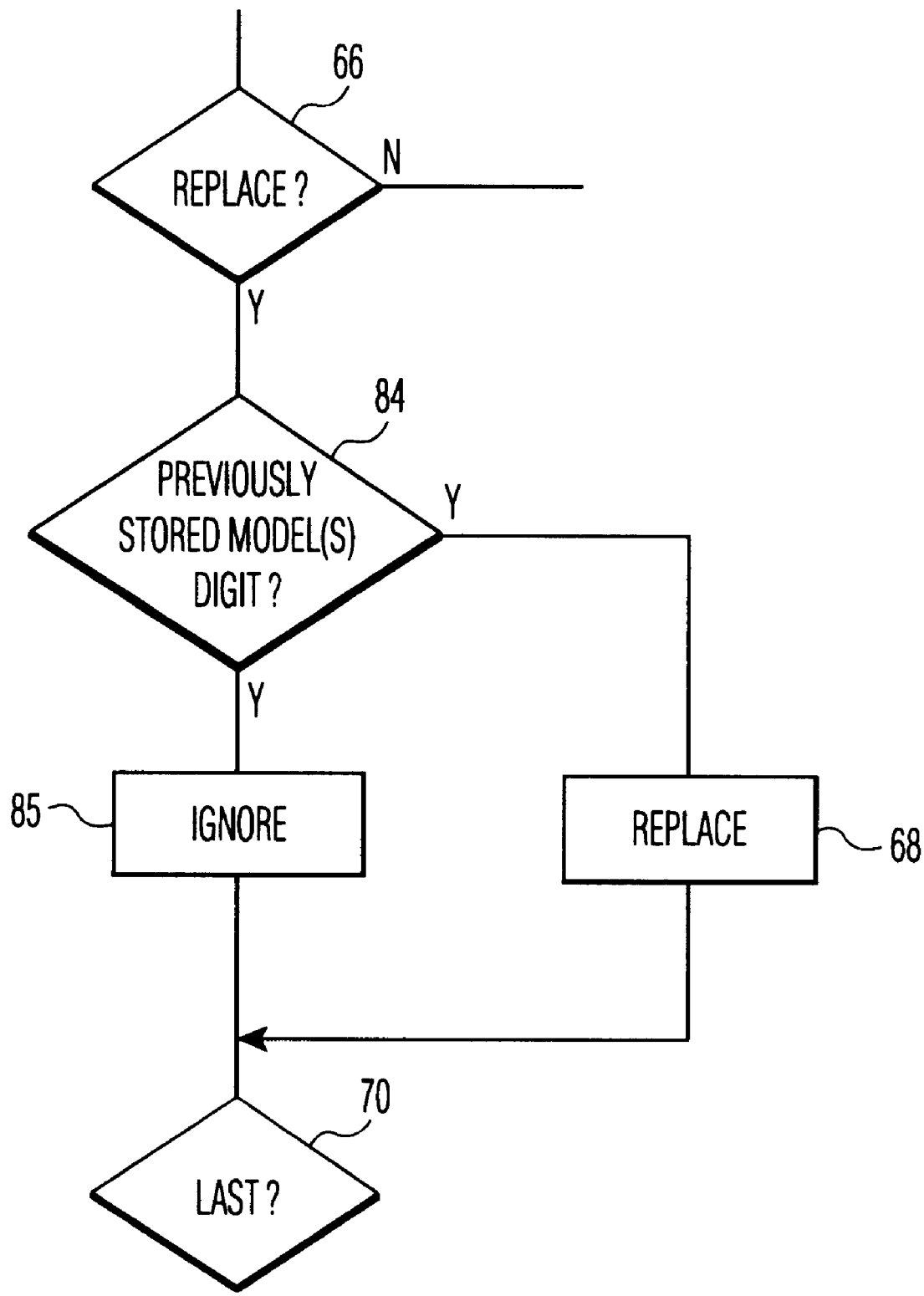
FIG. 5 in more detail shows blocking of speech items of a subset of stored speech items in the data base.

FIG. 5 in more detail shows blocking of speech items of a subset of stored speech items in the data base. In block 84 it is tested if the previously stored models are models of in a subset, such as a subset of digits. If so, in block 85, despite the user's choice to replace a previously stored item by the input speech recognition model, such a replacement is ignored.

What is claimed is:

1. A method for training a speech recognizer during a training mode thereof, said speech recognizer comprising a memory for storing speech recognition models corresponding to recognized utterances of a user of said speech recognizer, said method comprising:

voice inputting of an input utterance to the speech recognizer;

constructing an input speech model from said input utterance;

determining likelihood scores between said input speech model and previously stored speech recognition models;

determining whether there exists a low likelihood score among the determined likelihood scores, said low likelihood score being a score below a predetermined threshold value;

if there exists no low likelihood score, accepting said input speech model for storage in said memory;

if there exists a low likelihood score, offering said user a choice between causing to store in said memory either one of said input speech model and a previously stored speech model corresponding to said low likelihood score; and changing said memory in accordance with said choice, whereby said previously stored speech model corresponding to said low likelihood score is deleted if the user chooses to cause storage of said input speech model.

2. A method of claim 1, wherein, if there exist more than one low likelihood score, and the user chooses to cause storage of said input speech model, deleting all previously stored speech models corresponding to said low likelihood scores.

3. A method of claim 1, wherein deletion of a subset of previously stored models in said memory is prevented.

4. A method of claim 3, wherein said subset of previously stored models corresponds to utterances of digits.

5. An apparatus with a speech recognizer, said speech recognizer comprising:

a memory for storing speech recognition models corresponding to recognized utterances of a user of said speech recognizer;

voice inputting means for inputting of an input utterance of said user to said speech recognizer;

means for constructing an input speech model from said input utterance;

means for determining likelihood scores between said input speech model and previously stored speech recognition models;

means for determining whether there exists a low likelihood score among the determined likelihood scores, said low likelihood score being a score below a predetermined threshold value;

means for accepting said input speech model for storage in said memory, if there exists no low likelihood score;

means for offering said user a choice between causing to store in said memory either one of said input speech model and a previously stored speech model corresponding to said low likelihood score, if there exists a low likelihood score; and means for changing said memory in accordance with said choice, whereby said previously stored speech model corresponding to said low likelihood score is deleted if the user chooses to cause storage of said input speech model.

6. An apparatus as claimed in claim 5, said apparatus being a telephone apparatus.

* * * * *